FIG_1_

HMA   HMA-S

INVENTOR.
REMSEN TEN EYCK SCHENCK

INVENTOR.
Remsen Ten Eyck Schenck,
BY
Paul & Paul
ATTORNEYS.

United States Patent Office 3,418,087
Patented Dec. 24, 1968

3,418,087
HYDRATED MAGNESIUM ALUMINATE CONTAINING BOUND SULFATE AND PROCESSES FOR PREPARING SAME
Remsen Ten Eyck Schenck, Bangor, Pa., assignor to Keystone Chemurgic Corporation, Bethlehem, Pa., a corporation of Pennsylvania
Continuation-in-part of application Ser. No. 319,695. Oct. 29, 1968. This application Feb. 9, 1966, Ser. No. 526,123
8 Claims. (Cl. 23—315)

ABSTRACT OF THE DISCLOSURE

Hydrated magnesium aluminate containing bound sulfate and characterized by the oxide ratio $2Al_2O_3$, $2MgO$, $SO_3$ is prepared by reacting alkali metal aluminates with magnesium sulfate. Simultaneously, a dilute acid solution is added to the reaction mixture at a rate to maintain a pH between 6 and 10 thereby precipitating the aluminate product. The product is useful as an ingredient in pharmaceutical formulations designed for the control of gastric acidity.

---

Figure 1:
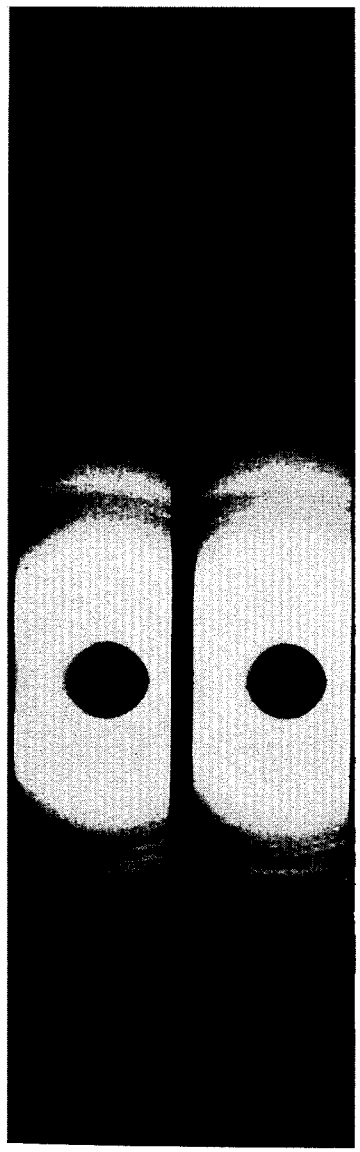

The present invention relates to a new chemical compound consisting of hydrated magnesium aluminate containing bound sulfate, and processes for its production.

This application is a continuation-in-part of my copending application Ser. No. 319,695, filed Oct. 29, 1963 now U.S. Patent No. 3,323,992, which application was a division of my then copending Ser. No. 59,155, filed Sept. 29, 1960, now abandoned, which application was partly a continuation-in-part of my then copending application Ser. No. 839,303, filed Sept. 11, 1959, and now abandoned, which application was a continuation-in-part application of my then copending application Ser. No. 647,448, filed Mar. 21, 1957, and now abandoned.

The anhydrous form of magnesium aluminate, $MgAl_2O_4$, is exemplified by the well-known mineral spinel. It has also been synthesized by heating at a very high temperature a mixture of magnesium and aluminum oxides. In this state, it is comparatively inert toward nearly all chemical reagents, and possesses a high fusing point. Particularly well-crystallized specimens are valued as gemstones; except for this and some limited use as a refractory, the substance is of little interest chemically and of none at all biologically.

It has also been proposed to produce metal aluminates by reacting an alkali metal aluminate and a salt of a metal. Reactions of this sort are described in U.S. Patents Nos. 2,395,931 and 2,413,184 and result in products which are relatively inactive chemically and which have substantially lower water contents and greater particle size characteristics than the product of the present invention.

In my copending application Ser. No. 319,695, filed Oct. 29, 1963, I have explained that magnesium aluminates may be economically prepared in a hitherto-undescribed, highly hydrated and chemically active form. When produced by one of the wet processes therein described, the hydrated magnesium aluminates are finely-divided, tasteless, insoluble white powders which, in contrast to the magnesium aluminate products hitherto known are highly reactive toward many chemical reagents, notably toward acids.

A suspension of such hydrated magnesium aluminates in distilled water shows a pH of 8.0 to 8.5. On addition of dilute acid, such as N/10 HCl, the first action involves decomposition of the molecule into aluminum hydroxide and magnesium chloride. The latter dissolves, while the former remains suspended in a very highly active form. Two equivalents of acid are consumed in this step, and the pH drops to approximately 4. Further additions of acid to the mixture react with the liberated aluminum hydroxide. This step takes place at a constant pH; no reduction of pH below 4 can occur until all the aluminum hydroxide is consumed. Since six additional equivalents of acid are required for this, the buffer action of the hydrated magnesium aluminates in the region of pH 4 is pronounced.

By virtue of the above properties, the hydrated magnesium aluminates are of interest pharmacologically, as a treatment for excessive gastric acidity. Unlike many other remedies of this type, it cannot over-alkalize the gastric juice when used in normal or usual doses. It establishes a pH in the ideal range near 4 in the stomach, and maintains this for an extended period in spite of continual secretion of additional acid by the stomach.

The hydrated magnesium aluminates containing bound sulfate of this invention are devoid of toxicity, their metabolic products being simple magnesium and aluminum salts, and may thus be freely ingested, the dosage required is small because of its low equivalent weight. In spite of the relatively high degree of hydration of the salt, the equivalent weight is only 40, which is comparable with those of calcium carbonate and magnesium carbonate, and less than half as great as that of sodium bicarbonate.

Hydrated magnesium aluminate containing bound sulfate contains no carbon dioxide, and thus is not a carminative. In some applications this is a decided benefit, as for instance where a simple antacid effect, unaccompanied by eructation, is desired.

Few side effects, and those of no importance, have been reported to accompany the use of aluminum and magnesium compounds as antacids. The former occasionally produces a slight tendency to constipation, while the latter sometimes has a laxative action. Neither effect is appreciable in normal dosage. Furthermore, it is believed that combining the two substances in a single treatment, as in hydrated magnesium aluminate, results in cancellation of the two factors.

Hydrated magnesium aluminate containing bound sulfate may profitably be used as an additional ingredient in pharmaceutical formulations designed primarily for other purposes than control of gastric acidity. For example, certain substances widely employed as analgesics have, as a side effect, the property of irritating the gastric mucosa into secreting more than the normal amount of acid. The hydrated magnesium aluminate containing bound sulfate of the present invention may be advantageously incorporated with such analgesics.

I have found that the processes as provided in accordance with this invention may be used to produce hydrated magnesium aluminates containing bound sulfate, which processes are illustrated in more specific detail in the following examples:

Example 1

In a reaction vessel equipped with a mechanical stirrer, means for adding simultaneously two separate liquids at individually controlled rates, and a set of electrodes for determination of the pH of the mixture, is placed a solution of 75 gm. of magnesium sulfate heptahydrate (common Epsom salt) in 1 liter of water. A quantity of sodium aluminate containing 0.4 gram-atoms of aluminum, corresponding to 33 gm. of actual $NaAlO_2$, is dissolved in 2 to 4 times its own weight of water to make a fairly concentrated solution, and this is allowed to flow slowly into the stirred magnesium solution. The pH of the mixture, which is close to 7 initially, begins to increase as aluminate solution is added. When it reaches 8, the simultaneous addition of dilute sulfuric acid (conveniently of about 10% strength) is commenced. The flow of both sodium aluminate and sulfuric acid solutions is so regulated throughout that the pH of the reaction mixture is maintained between 8 and 9. When all the aluminate solution has been added, the flow of acid is likewise terminated. The final reaction mixture should have a pH of 8 to 9. The precipitate is collected by filtration or centrifugation, adherent mother liquor being displaced by a brief washing of the cake with water. By drying and grinding the resulting magma, there is obtained approximately 60 gm. of a finely-divided white powder which is rapidly and completely soluble in dilute acids.

Example 2

In a reaction vessel equipped with a mechanical stirrer, means for adding simultaneously two separate liquids at individually controlled rates, and a set of electrodes for determination of the pH of the mixture, is placed a solution of 75 gm. of magnesium sulfate heptahydrate (common Epsom salt) in 1 liter of water. A quantity of sodium aluminate containing 0.4 gram-atom of aluminum, corresponding to 33 gm. of actual $NaAlO_2$, is dissolved in 2 to 4 times its own weight of water to make a fairly concentrated solution, and this is allowed to flow slowly into the stirred magnesium solution. The pH of the mixture, which is close to 7 initially, begins to increase as aluminate solution is added. When it reaches 8, the simultaneous addition of dilute hydrochloric acid (conveniently of about 10% strength) is commenced. The flow of both sodium aluminate and hydrochloric acid solution is so regulated throughout that the pH of the reaction mixture is maintained between 8 and 9. When all the aluminate solution has been added, the flow of acid is likewise terminated. The final reaction mixture should have a pH of 8 to 9. The precipitate is collected by filtration or centrifugation, adherent mother liquor being displaced by a brief washing of the cake with water. By drying and grinding the resulting magma there is obtained approximately 60 gm. of a finely-divided white powder which is rapidly and completely soluble in dilute acids.

Example 3

In a reaction vessel equipped with a mechanical stirrer, means for adding simultaneously two separate liquids at individually controlled rates, and a set of electrodes for determination of the pH of the mixture, is placed a solution of 75 gms. of magnesium sulfate heptahydrate (common Epsom salt) in 1 liter of water. A quantity of sodium aluminate containing 0.4 gram-atoms of aluminum, corresponding to 33 gm. of actual $NaAlO_2$, is dissolved in 2 to 4 times its own weight of water to make a fairly concentrated solution, and this is allowed to flow slowly into the stirred magnesium solution. The pH of the mixture, which is close to 7 initially, begins to increase as aluminate solution is added. When it reaches 8, the simultaneous addition of dilute acetic acid (conveniently of about 10% strength) is commenced. The flow of both sodium aluminate and acetic acid solutions is so regulated throughout that the pH of the reaction mixture is maintained between 8 and 9. When all of the aluminate solution has been added, the flow of acid is likewise terminated. The final reaction mixture should have a pH of 8 to 9. The precipitate is collected by filtration or centrifugation, adherent mother liquor being displaced by a brief washing of the cake with water. By drying and grinding the resulting magma, there is obtained approximately 60 gm. of a finely-divided white powder which is rapidly and completely soluble in dilute acids.

When the material produced by the processes of the above examples is dried at the lowest effective temperature, it contains about 32% $Al_2O_3$ and about 12.5% MgO. More vigorous conditions of drying drive off part of the water of hydration with the result that the aluminum oxide content increases to about 38% and the magnesium oxide content to about 15%. Ignition of the latter material at 900–1000° C. drives off approximately 47% of the initial weight as volatile product. The fraction thus lost on ignition is preponderately water and also contains an appreciable amount of $SO_3$. That this sulfur must be combined in the product follows from the observation that leaching with water extracts only negligible amounts of sulfate; since both magnesium and aluminum sulfates are freely soluble in water the sulfur cannot be present in either of these forms. Only by complete solution of the material in an acid such as hydrochloric acid can the sulfate be liberated from its bound condition. So treated, a material containing 38% $Al_2O_3$ and 15% MgO is found to contain 15% $SO_3$. This corresponds to an oxide ratio of $2Al_2O_3:2MgO:SO_3$.

In accordance with the following examples, the product produced by the process of this invention, hereinafter identified as hydrated magnesium aluminate containing bound sulfate or HMA-S, has been compared with the product produced by the process disclosed in my copending patent application Ser. No. 319,644, filed Oct. 29, 1963, hereinafter identified as hydrated magnesium aluminate or HMA.

Example 4

An X-ray diffraction pattern has been prepared of each of said samples in a 57.0 mm. camera with unfiltered Cu K-radiation (10 hours exposure at 30 kv. and 10 ma.), FIG. 1. Referring to said patterns, the diffraction lines are broad, and this is believed to be due to the smallness of the crystalline domains, and the patterns are sufficiently similar that close agreement of the majority of the repeating distances in both structures is indicated. Although the basic symmetry is clearly the same for both structures, the differences between the two patterns show that there are distinct differences in some of the repeating distances, and these differences are directly attributable to the presence in the coordination latice of the sulfate in the case of hydrated magnesium aluminate containing bound sulfate, and its absence in the case of hydrated magnesium aluminate.

Example 5

Figure 2:
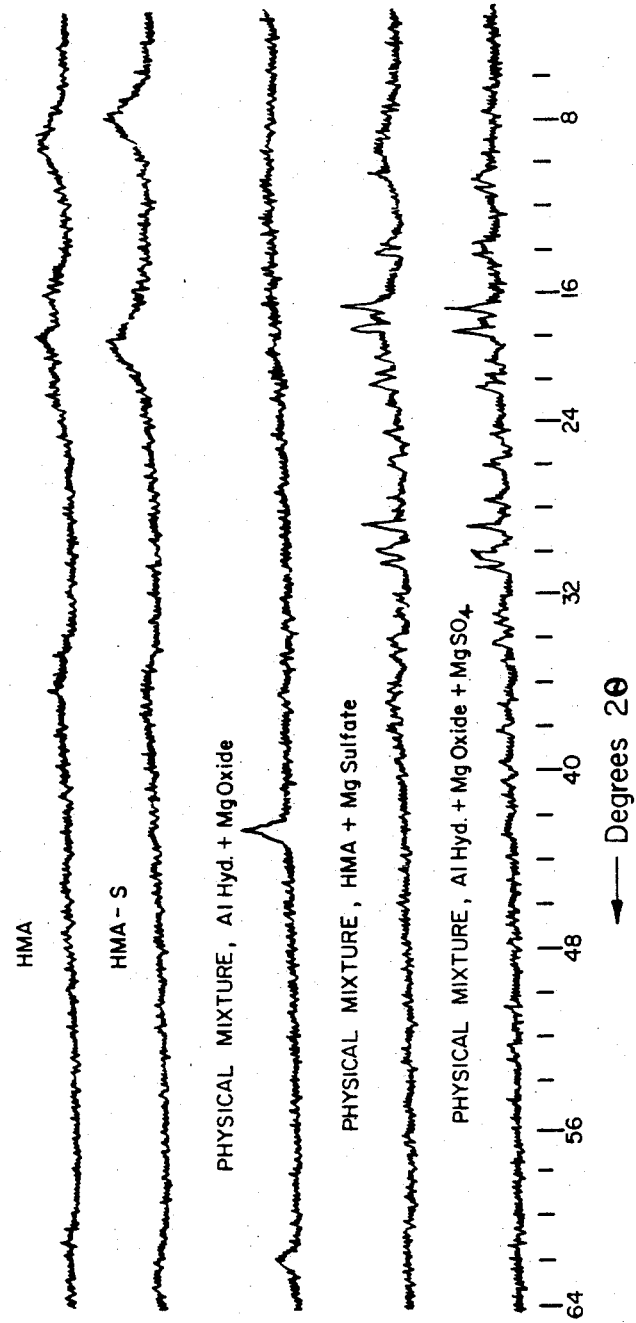

Geiger counter diffractometer X-ray spectra charts have been prepared for each of said samples, and also for several physical mixtures approximating the same total magnesium, aluminum, water, and sulfate contents as these samples would have when made in accordance with the respective processes, FIG. 2. These charts indicate striking differences between the physical mixtures and the two hydrated magnesium aluminates. From these charts, it is shown that:

(a) Hydrated magnesium aluminate is crystallographically different and distinguishable from a physical mixture of hydrous alumina and magnesium oxide.

(b) Hydrated magnesium aluminate containing bound sulfate is crystallographically similar to hydrated magnesium aluminate, but it is not identical with it.

(c) There is no detectable amount of magnesium sulfate present in hydrated magnesium aluminate containing bound sulfate as a distinct and separate phase.

Example 6

Figure 3:
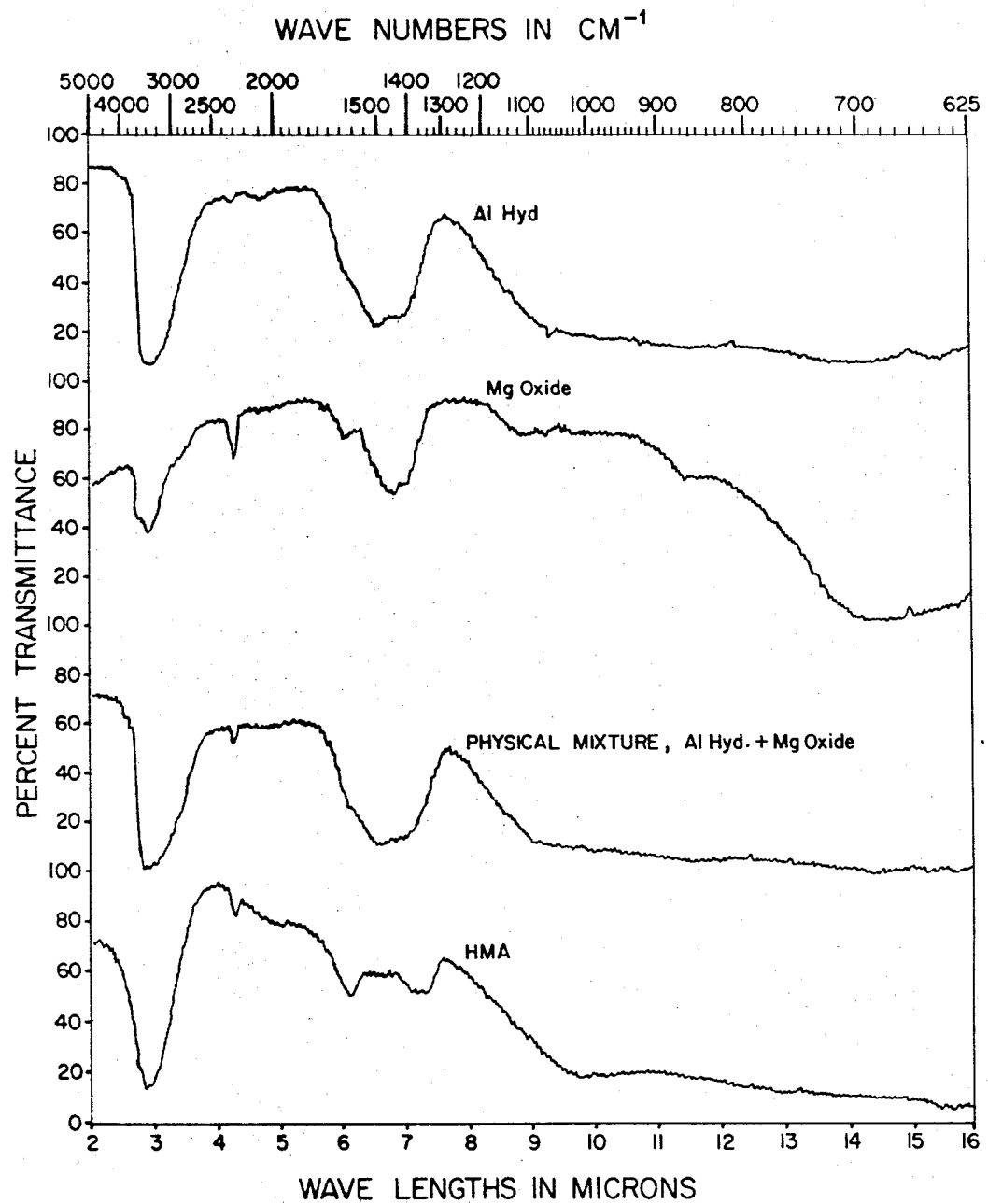
Figure 4:
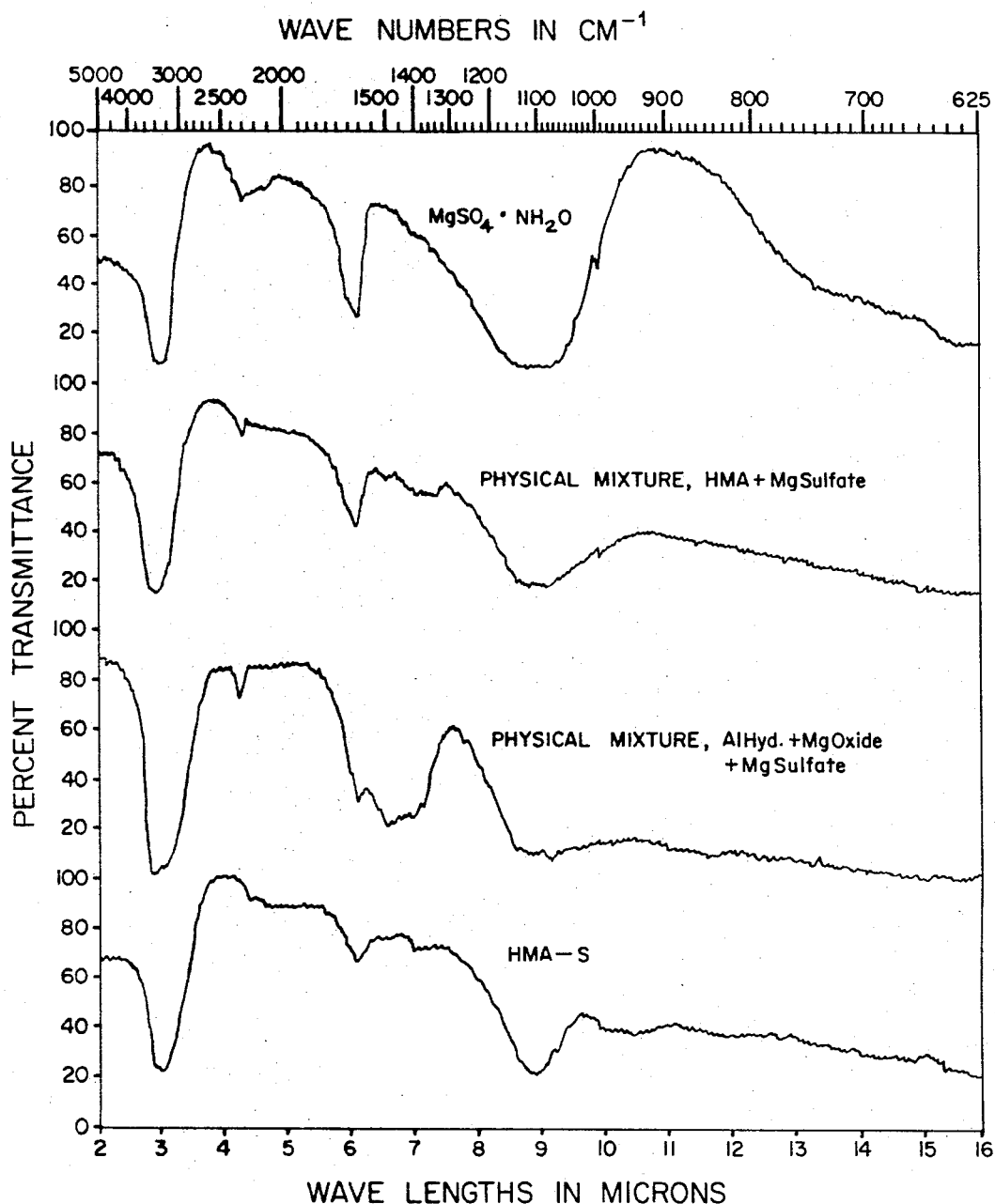

Infrared absorption spectra charts for each of said samples have been prepared and also for several substances and mixtures which might be expected to be similar to, or components of the compounds described in the respective patent applications, FIGS. 3 and 4. All of these spectra were obtained by means of 2% dispersions of the specimen in a pressed KBr pellet (2 mg. of sample in 100 mg. of KBr), and were run in the rocksalt region in a Baird-Atomic Model 4–55 spectrophotometer. FIG. 3 shows that in a physical mixture of aluminum hydroxide dried gel and magnesium oxide, the characteristic absorption bands of the two individual components can be clearly seen, e.g., in the O-H stretching region at 2.7–3.1μ, in the Mg-O stretching vibration band at 4.3μ, and in the O-H deformation bands between 6 and 7μ. The spectrum of the physical mixture is additively composed of the spectra of the two components, summed in the proportion of their relative concentrations. By contrast, the spectrum of hydrated magnesium aluminate is clearly different from that of the physical mixture having the same magnesium, aluminum, and water contents. The O-H stretch band of hydrated magnesium aluminate has a fairly sharp peak absorption at 2.85–2.90μ, whereas the mixture has a broad peak ranging from 2.80 to 3.10μ. The O-H deformation bands between 6 and 7μ are pronouncedly different for hydrated magnesium aluminate than for the mixture, and new bands appear for hydrated magnesium aluminate at 7.3 and 9.75μ, which have no counterparts in the spectra of aluminum hydroxide dried gel or magnesium oxide. FIG. 4 shows that there are characteristic bands of magnesium sulfate as follows: (1) a doublet of sharp bands at 6.00–6.03μ and 6.10–6.15μ, and (2) a broad doublet at 8.85 and 9.20μ. These bands are also clearly distinguishable in the physical mixtures containing magnesium sulfate. By contrast, hydrated magnesium aluminate containing bound sulfate shows only a single broad band at 6.05–6.15μ, and a single band at 8.90μ. The hydrated magnesium aluminate containing bound sulfate has bands at 4.7μ and 10.5μ which have no counterparts in the spectra of the physical mixtures. Comparison of the spectra of hydrated magnesium aluminate and hydrated magnesium aluminate containing bound sulfate in FIGS. 3 and 4, shows that although the bands are similar in the fundamental region (2 to 8μ), they are not identical. In particular, it may be noted that the O-H stretch band in hydrated magnesium aluminate containing bound sulfate is broader and displaced toward longer wave lengths relative to the same band in hydrated magnesium aluminate. This is a well-known type of phenomenon that occurs in O-H stretching vibration bands, and signifies that the degree of hydrogen-bonding is substantially greater in hydrated magnesium aluminate containing bound sulfate than it is in hydrated magnesium aluminate. Also, hydrated magnesium aluminate shows an Mg-O stretching vibration band at 4.3μ which is absent in the case of hydrated magnesium aluminate containing bound sulfate, thus establishing the fact that the Mg is differently bound in these two substances. The above described infrared spectra establish the following facts:

(a) Hydrated magnesium aluminate is a unique species that is different from a physical mixture of aluminum hydroxide dried gel and magnesium oxide.

(b) Hydrated magnesium aluminate containing bound sulfate is a unique species that is different from a physical mixture of any of the components that might be conceived of as leading to the same elemental composition.

(c) The Mg in hydrated magnesium aluminate containing bound sulfate is differently bound to its neighbors than is the Mg in either hydrated magnesium aluminate or magnesium oxide.

(d) The O-H groups in hydrated magnesium aluminate containing bound sulfate are more strongly hydrogen-bonded to neighboring O-H's than is the case in hydrated magnesium aluminate.

(e) The sulfate groups in hydrated magnesium aluminate containing bound sulfate are differently bound to their neighbors than is the case for the sulfate groups in magnesium sulfate.

Example 7

Figure 5:
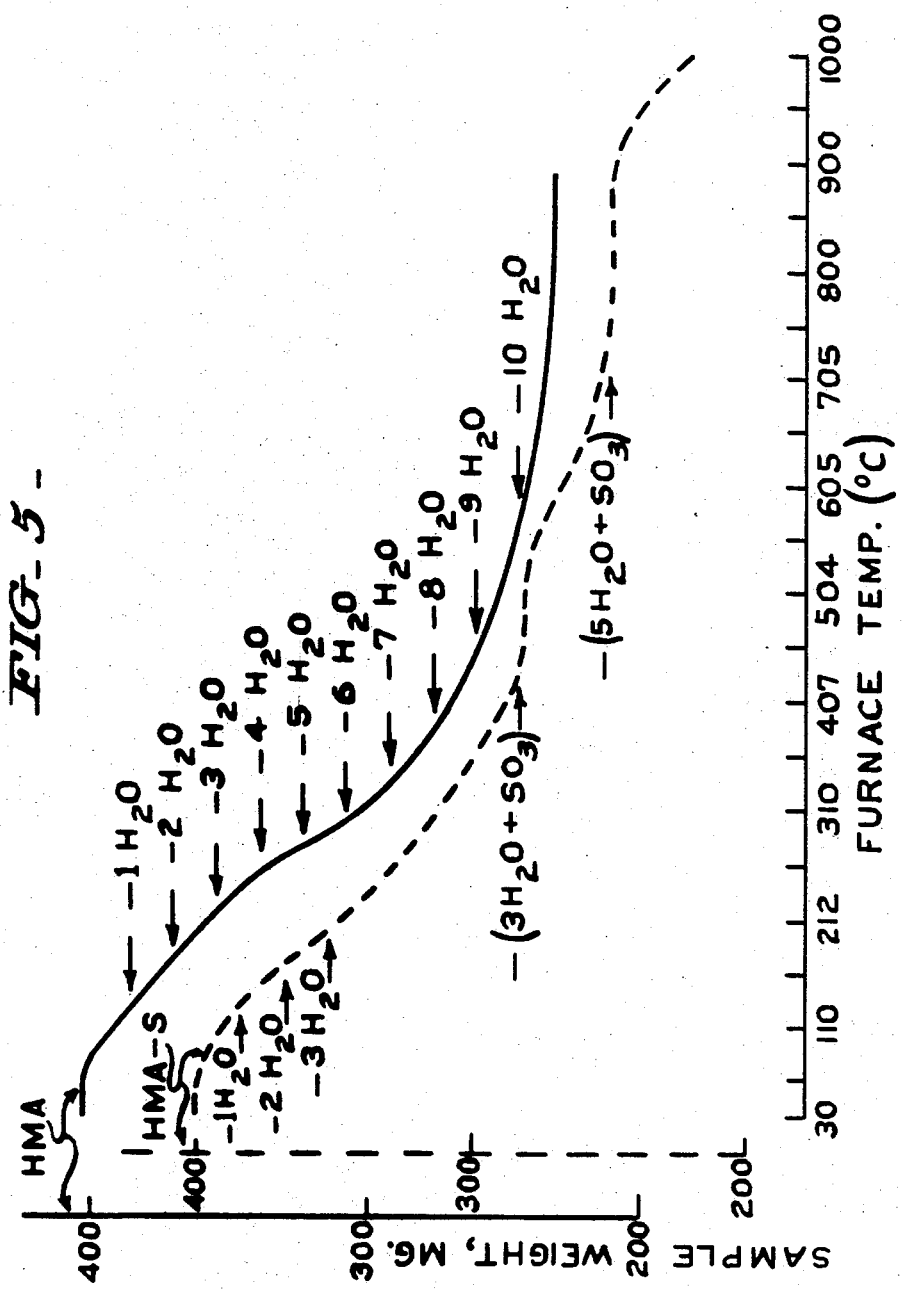
Figure 6:
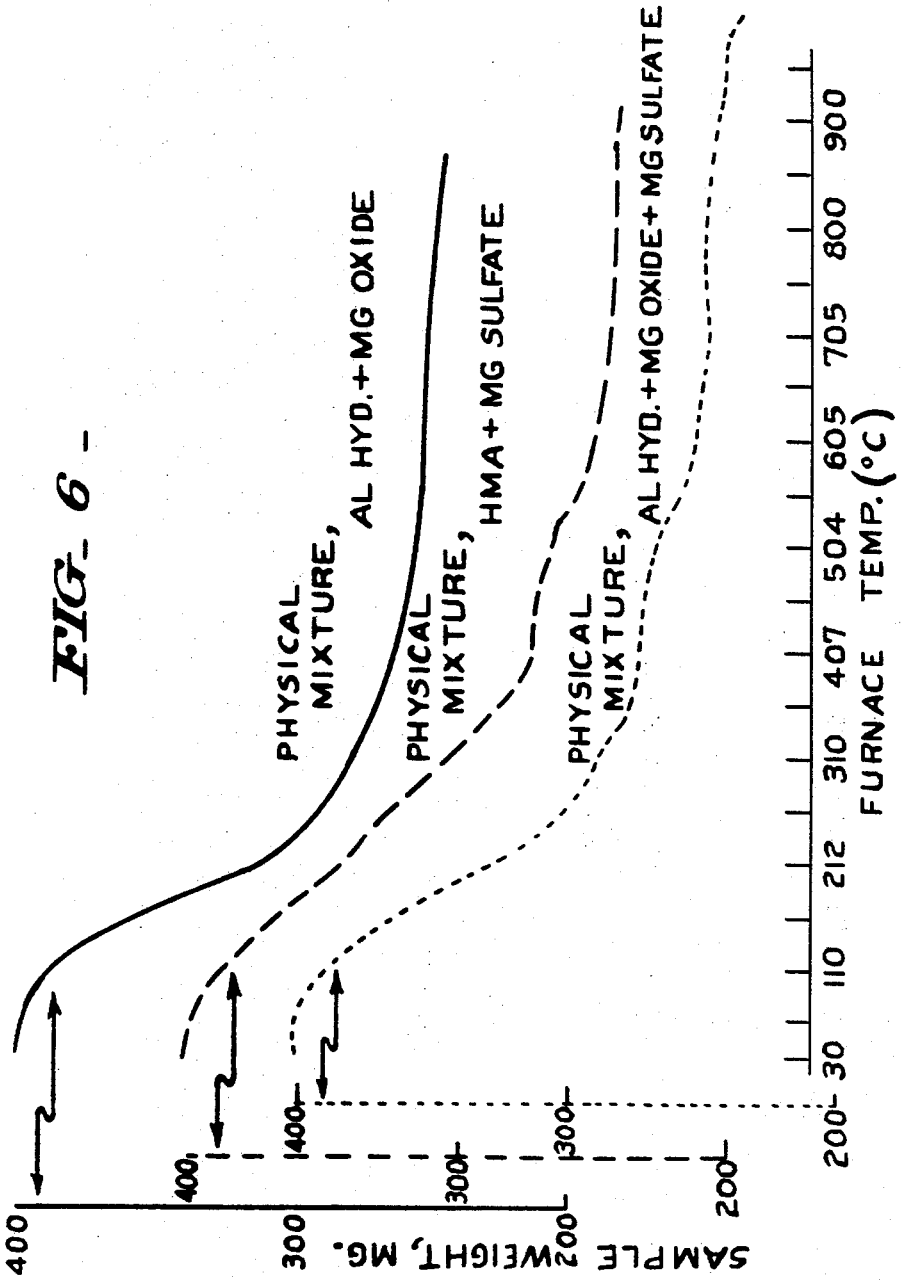

Thermograms of said samples have been prepared on a recording thermobalance which compare the thermogravimetric behavior of hydrated magnesium aluminate and hydrated magnesium aluminate containing bound sulfate in the temperature range from 30° C. to 1000° C. when heated in an air atmosphere in a porcelain crucible at a rate of 6° C. per minute, FIG. 5. The HMA thermogram shows that hydrated magnesium aluminate loses ten molecules of water in fairly uniform stages between room temperature and about 550° C., with an increase occurring in the rate of weight loss in the vicinity of 240° C., after the first four water molecules have departed, and a slowing down of the rate of weight loss after about eight water molecules have been driven off. The HMA-S thermogram shows that hydrated magnesium aluminate containing bound sulfate behaves thermogravimetrically by first losing three molecules of water, followed by the loss of a molecule of $SO_3$ commencing at about 190° C. and complete by the time 420° C. is reached, after which the remaining two molecules of water are evolved, which process is not complete until about 750° C. has been reached. It will be noted that the thermal stabilities and kinetics of decomposition of hydrated magnesium aluminate and hydrated magnesium aluminate containing bound sulfate are markedly different, showing that the presence of the sulfate groups in the latice of the latter has an important effect on the binding energies of the water of hydration and of the hydroxyl groups within the layer latice. The fact that the total water content of hydrated magnesium aluminate is driven off by about 550° C., whereas it is necessary to heat hydrated magnesium aluminate containing bound sulfate at least 200° C. higher to achieve the same result is in excellent accord with the markedly stronger hydrogen-bonding interaction between adjacent O-H groups in hydrated magnesium aluminate containing bound sulfate that has been established by the infrared spectral studies described in Example 6, above. Corresponding thermograms have been prepared by similar processes, of physical mixtures having the same total content of magnesium, aluminum, sulfate and water as the hydrated magnesium aluminate or hydrated magnesium aluminate containing bound sulfate described in said patent applications, but composed of aluminum hydroxide dried gel, magnesium oxide, and hydrated magnesium sulfate in appropriate proportions, FIG. 6. Comparison of the FIG. 5 and FIG. 6 curves discloses significant differences which are in full accord with the foregoing X-ray and infrared data, which also shows that hydrated magnesium aluminate and hydrated magnesium aluminate containing bound sulfate are unique species which are distinctly different from the physical mixtures of the components that might conceivably have been produced in the course of the precipitation reaction. The results of these thermogravimetric studies lead to the following conclusions:

(a) Hydrated magnesium aluminate containing bound sulfate is distinctly different from hydrated magnesium aluminate in thermal stability and kinetics of thermal decomposition.

(b) The presence of sulfate in the hydrated magnesium aluminate containing bound sulfate latice increases the degree of hydrogen-bonding of adjacent hydroxyl groups, thereby increasing the thermal stability of those groups.

(c) Both hydrated magnesium aluminate and hydrated magnesium aluminate containing bound sulfate are different from physical mixtures of aluminum hydroxide, magnesium oxide and magnesium sulfate.

While I have described the present invention in terms of preferred examples, it will be understood that various modifications and supplemental steps may be employed in carrying out the process as defined in the appended claims. For instance, in the step of regulating the pH by addition of dilute acid, other common acids may be substituted for those described; any acid which forms a soluble salt with magnesium may be chosen. Furthermore, both the magnesium salt and the alkali metal aluminate may be dissolved in water to give solutions of concentrations widely different from the specific examples cited. Likewise, the alkali metal aluminate may be the aluminate of lithium, sodium, potassium, rubidium, or cesium, although the sodium or potassium aluminate is preferred as being more readily available. The proportions of magnesium and aluminum taken may be stoichiometrically exact, or the magnesium may be taken in excess over a wide range.

For use as an antacid, the hydrated magnesium aluminate containing bound sulfate of this invention is preferably tabletted in unit doses containing approximately 5 grains of the active ingredient per tablet. Sugar, dextrin or other binder can be used in the tabletting operation.

For the treatment of gastric hyperacidity, these tablets are taken by mouth. A single 5-grain dose is nearly always sufficient to afford prompt relief. If distress recurs, the dose may be repeated. Following treatment with the product of the present invention, the duration of effective gastric acidity control is more prolonged than that attained with products that do cause acid rebound.

The hydrated magnesium aluminate containing bound sulfate of this invention may also be included to good effect in analgesic preparations. For example, standard 5-grain aspirin tablets which have been formulated to contain 2 to 3 grains of hydrated magnesium aluminate containing bound sulfate per tablet are noticeably less likely to provoke symptoms of hyperacidity than plain aspirin. Such tablets do not require a binder, as the aspirin itself serves this purpose very well. It is sufficient to mix the ingredients intimately, including any lubricants and excipients, granulate with a non-aqueous fluid such as alcohol, and compress into tablets.

Having thus described my invention, I claim:

1. The process for preparing hydrated magnesium aluminate containing bound sulfate wherein a solution of an alkali metal aluminate is mixed with a solution of magnesium sulfate, in the proportions of at least ½ gram-atom of magnesium per gram-atom of aluminum used, with the simultaneous introduction into the mixture of a dilute acid selected from the group consisting of hydrochloric acid, acetic acid, and sulfuric acid, the addition of the aluminate and the acid being at a rate such that the mixture is maintained at a pH between 6 and 10, thereby obtaining a precipitate which contains magnesium and aluminum in stoichiometric amounts of at least ½ gram-atom of magnesium per gram-atom of aluminum and which forms a magma.

2. The process for preparing hydrated magnesium aluminate containing bound sulfate wherein a solution of an alkali metal aluminate is mixed with a solution of magnesium sulfate, in the proportions of at least ½ gram-atom of magnesium per gram-atom of aluminum used, with the simultaneous introduction into the mixture of a dilute solution of sulfuric acid at a rate such that the mixture at all times is maintained at a pH between 6 and 10, thereby obtaining a precipitate which contains magnesium and aluminum in stoichiometric amounts of at least ½ gram-atom of magnesium per gram-atom of aluminum and which forms a magma.

3. The process of claim 1 in which the alkali metal aluminate is sodium aluminate.

4. The process of claim 1 in which the alkali metal aluminate is potassium aluminate.

5. The process for preparing hydrated magnesium aluminate containing bound sulfate wherein a solution of an alkali metal aluminate is mixed with a solution of magnesium sulfate, in the proportion of at least ½ gram-atom of magnesium per gram-atom of aluminum used, with the simultaneous introduction into the mixture of an acid selected from the group consisting of hydrochloric acid, acetic acid, and sulfuric acid, the addition of the aluminate and the acid component being at a rate such that the mixture is maintained at a pH between 6 and 10, thus obtaining a precipitate which contains magnesium and aluminum in stoichiometric amounts of at least ½ gram-atom of magnesium per gram-atom of aluminum and which forms a magma, and then drying and grinding the resulting magma to obtain a finely-divided white powder.

6. The process of claim 5 in which the alkali metal aluminate is sodium aluminate.

7. The process of claim 5 in which the alkali metal aluminate is potassium aluminate.

8. Hydrated magnesium aluminate containing bound sulfate and characterized by the oxide ratio $2Al_2O_3:2MgO:SO_3$.

References Cited

UNITED STATES PATENTS

| | | | |
|---|---|---|---|
| 1,914,178 | 6/1933 | Steuart | 23—123 |
| 2,797,978 | 7/1957 | Beekman | 23—315 XR |
| 3,347,640 | 10/1967 | Higuchi et al. | 23—315 |
| 3,347,641 | 10/1967 | Higuchi et al. | 23—315 |

FOREIGN PATENTS

| | | |
|---|---|---|
| 248,939 | 1/1964 | Australia. |
| 25 | 11/1960 | France. |

OTHER REFERENCES

Hovvman—"Lexikon Der Anorganische Verbindungen"—vol. 2, p. 13, 1914.

Dissertation Abstracts, vol. 22, pp. 3868–3869 (May 1962).

EARL C. THOMAS, *Primary Examiner.*

H. T. CARTER, *Assistant Examiner.*

U.S. Cl. X.R.

23—52, 124; 167—55